3,312,157
COMPOSITIONS AND METHODS OF USE OF
ATACTIC POLYOLEFINS
Salvatore G. Coscia, Philadelphia, Pa., assignor to De Kalb Industries, Inc., King of Prussia, Pa., a corporation of Pennsylvania
No Drawing. Filed Feb. 2, 1965, Ser. No. 429,923
8 Claims. (Cl. 94—9)

This invention relates to compositions and methods of use of atactic polyolefins, particularly atactic polypropylene, and it more particularly relates to the use of such materials in road construction and the like.

Although it has heretofore been proposed to use atactic polypropylene in admixture with asphalt to increase the penetration ratio or flexibility of the asphalt, it has not heretofore been known how to most easily and effectively utilize the atactic polypropylene in road construction.

It is, therefore, one object of the present invention to provide an easy and effective method of constructing roads and the like utilizing atactic polypropylene in this construction.

Another object of the present invention is to provide improved compositions for road building and the like, which compositions utilize a mixture of asphalt and atactic polypropylene.

Other objects of the present invention will be apparent from the following specification and claims.

Asphalt-type roads generally include a base and a surface course. The surface course, or top layer, is asphalt or an asphalt composition, whereas the base generally comprises an aggregate or granular mixture of one or more materials selected from the group consisting of stone, dust, sand, cement dust, slag recovered as a by-product from the manufacture of steel, etc. It has, heretofore, been difficult to effectively bind the granular material together to prevent shifting and consequent weakening of the surface course. There has also, heretofore, been no effective way to bond the surface course to the granular base except by the asphalt itself. However, the asphalt tended to quickly deteriorate under conditions of extreme temperature fluctuations and heavy traffic, resulting in cracking and deterioration of the bond.

In accordance with the present invention, a secure and substantially permanent bond, unaffected by temperature variations and traffic pressures, is established both between the particles of the base with each other and between the base and the surface course, by applying an intermediate tack coat between the base and the surface course. This tack coat comprises a mixture of atactic polypropylene and asphalt in a proportion of about 25–50 parts by weight atactic polypropylene to about 75–50 parts by weight asphalt. This composition is preferably applied from a volatile solvent system.

The availability of a volatile solvent system for applying the tack coat is highly important because it permits the application to be made at the ambient temperature of the air, even fall or winter. It, furthermore, eliminates the time, labor and equipment heretofore necessary for applying asphalt in the form of a hot mix or melt.

Among the solvents for the atactic polypropylene which may effectively be used are members of the paraffin series with a carbon chain length of $C_4$ to $C_{15}$. Also unsaturated aliphatic hydrocarbons of a chain length between $C_4$ and $C_{10}$. In addition, such aromatics as benzene, toluene, xylene and cylohexane. In general, all halogen-substituted hydrocarbons, both aliphatic and aromatic, which are normally in a liquid state, may be used, including the halogenated aliphatics between $C_1$ and $C_{15}$ and whichever halogenated aromatics are normally liquid. All ethers such as petroleum ether and ethyl ether may be used. Non-viscous oils, especially the mineral seal type may be used. Kerosene is a particularly desirable vehicle.

In general, it is preferred to use a solvent which is normally liquid but which quickly volatilizes in air. For this reason, fast solvents such as methylene chloride are most desirable.

The following examples are illustrative of tack coats embodying the present invention:

EXAMPLE 1

| Component: | Parts by weight |
| --- | --- |
| Atactic polypropylene | 30 |
| Asphalt (Middle East) | 70 |
| Solvent naphtha (coal-tar naphtha) | 100 |

This mixture was prepared at ambient temperature (about 70° F.) and applied at such temperatrue as a coating on the granular base. The naphtha quickly volatilized and left a tacky coating over which a surface course, consisting essentially of a mixture of asphalt and stone dust, was laid.

EXAMPLE 2

| Component: | Parts by weight |
| --- | --- |
| Atactic polypropylene | 50 |
| Asphalt (Venezuelan) | 50 |
| Methylene chloride | 75 |

This mixture, too, was prepared at ambient temperature (about 70° F.) and applied at such temperature, in the same manner as in Example 1, and to the same base material. The same surface course was applied thereover.

The present invention is also applicable to the formation of the surface courses themselves. In such use, the same proportion of atactic polypropylene and asphalt as described above, i.e. about 25–50 atactic polypropylene and 75–50 asphalt, is utilized in making a bonding composition. This bonding composition is then mixed with the primary ingredients of the surfacing composition to form the finished product. Illustrative of this use is the following example:

EXAMPLE 3

A bonding composition was prepared at ambient temperature (about 70° F.) and consisted of:

| Component: | Parts by weight |
| --- | --- |
| Atactic polypropylene | 25 |
| Asphalt (Venezuelan) | 75 |
| Methylbenzene | 100 |

This bonding composition was then mixed at said ambient temperature with crushed Portland cement and crushed slag formed as a by-product of steel production (with a maximum mesh size of 30) in the following proportions: 10% by weight Portland cement, 80% by weight slag and 10% by weight bonding composition. This final composition was then applied, as a cold patch, over a base of granular material. After three hours, the cold patch was found to have completely set.

The surface course provided in accordance with the present invention, as illustrated in Example 3, is a great improvement of those obtainable heretofore because not only can the surface obtained by this invention be applied in any sort of weather or temperature, and not only can it be applied directly from a solvent solution without the necessity of heating and cooling, but the resultant surface is superior to those heretofore obtainable because of the permanent adhesion of the particles in both the base and surface layers and the added strength and wearability of the surface.

Although the road surface may be formed by application from a cool solvent solution, as set forth above, it is also possible to apply it from a melt or hot mix if it is, for any reason, not desired to use a solvent system. This is illustrated in the following example:

EXAMPLE 4

| Component: | Parts by weight |
|---|---|
| Sand | 75 |
| Limestone dust | 15 |
| Bonding mixture (55% by weight asphalt (Venezuelan), 45% by weight atactic polypropylene) | 10 |

This mixture was heated to 300° F. to melt the asphalt. The composition was then applied to a granular base with a rake, after which it was rolled smooth.

The atactic polypropylene utilized herein has a molecular weight of about 10,000 to 40,000. However, any atactic polypropylene is capable of utilization. Furthermore, other atactic polyolefins may be substituted, as for example, atactic polyethylene or atactic ethylene-propylene co-polymer, preferably one in which the ratio of ethylene to propylene is about 60–40% by weight.

The present invention has been described with relation to the construction of roads. However, it is also adapted for other uses such as asphalt roofing, protective coatings, liners, etc.

Obviously, many modifications of the present invention are possible in the light of the above teachings. It is, therefore, to be understood that within the scope of the appended claims, the invention may be practiced otherwise than as specifically described.

The invention claimed is:

1. A road construction comprising a base of granular material, an intermediate layer, consisting essentially of atactic polyolefin and asphalt in a ratio of about 25–50 parts by weight polyolefin and 75–50 parts by weight asphalt, and a surface layer comprising an asphalt composition.

2. A method of constructing a road which comprises forming a bed of granular material, applying an intermediate layer over said granular material, said intermediate layer consisting essentially of atactic polyolefin and asphalt in a ratio of about 25–50 parts by weight polyolefin and 75–50 parts by weight asphalt, and then applying an asphalt composition over the intermediate layer to form a surface layer.

3. The method of claim 2 wherein the atactic polyolefin is atactic polypropylene.

4. The method of claim 2 wherein said intermediate layer is applied from a solvent solution at ambient temperature.

5. The method of claim 2 wherein said intermediate layer is applied as a melt.

6. A method of forming a road which comprises applying to a granular base, as a surface layer, a composition comprising a mixture of atactic polyolefin and asphalt in a ratio of 25–50 parts by weight atactic polyolefin and 75–50 parts by weight asphalt.

7. The method of claim 6 wherein the composition is applied from a solvent solution at ambient temperature.

8. The method of claim 6 wherein the composition is applied as a melt.

References Cited by the Examiner

UNITED STATES PATENTS

| 2,475,699 | 7/1949 | Derksen | 260—28.5 |
| 2,599,986 | 6/1952 | Goebel et al. | 260—28.5 |
| 3,112,681 | 12/1963 | Gessler | 94—22 X |
| 3,141,304 | 7/1964 | Moore | 94—22 X |
| 3,144,423 | 8/1964 | Belak et al. | 260—28.5 |

JACOB L. NACKENOFF, *Primary Examiner.*